(12) United States Patent
Kuramoto et al.

(10) Patent No.: US 11,467,323 B2
(45) Date of Patent: Oct. 11, 2022

(54) LAMINATE AND LIGHT DIFFUSION CONTROL FILM

(71) Applicant: LINTEC CORPORATION, Tokyo (JP)

(72) Inventors: Tatsuki Kuramoto, Tokyo (JP); Kentaro Kusama, Tokyo (JP); Baku Katagiri, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 17/193,047

(22) Filed: Mar. 5, 2021

(65) Prior Publication Data

US 2021/0278573 A1 Sep. 9, 2021

(30) Foreign Application Priority Data

Mar. 6, 2020 (JP) .............. JP2020-039309

(51) Int. Cl.
| | |
|---|---|
| *G02B 5/02* | (2006.01) |
| *G02B 1/04* | (2006.01) |
| *G02B 5/22* | (2006.01) |
| *G02B 5/20* | (2006.01) |

(52) U.S. Cl.
CPC ............ *G02B 5/0205* (2013.01); *G02B 1/04* (2013.01); *G02B 5/0236* (2013.01); *G02B 5/0278* (2013.01); *G02B 5/0294* (2013.01); *G02B 5/208* (2013.01); *G02B 5/22* (2013.01)

(58) Field of Classification Search
None
See application file for complete search history.

(56) References Cited

U.S. PATENT DOCUMENTS

| | | | |
|---|---|---|---|
| 2016/0018571 A1* | 1/2016 | Kusama | ............... C08J 7/043 252/582 |
| 2018/0284591 A1* | 10/2018 | Kusama | ............... G02B 5/0278 |
| 2019/0219739 A1* | 7/2019 | Gregorski | ............ G02B 5/0236 |
| 2020/0271833 A1* | 8/2020 | Kuramoto | ............ G02B 5/0236 |
| 2021/0132268 A1* | 5/2021 | Kuramoto | ............ G02B 5/0278 |

FOREIGN PATENT DOCUMENTS

JP 6414883 62 10/2018

* cited by examiner

*Primary Examiner* — Derek S. Chapel
(74) *Attorney, Agent, or Firm* — Greenblum & Bernstein, P.L.C.

(57) ABSTRACT

A laminate used under an environment irradiated with external light includes a light diffusion control film having an internal structure in the film. The internal structure includes a plurality of regions having a relatively high refractive index in a region having a relatively low refractive index. The laminate further includes an ultraviolet absorbing layer located further on the external light incident side than the light diffusion control film. The light diffusion control film has an indentation elastic modulus of 30 MPa or more as measured at a maximum load of 2 mN by a nanoindentation method.

8 Claims, 2 Drawing Sheets

LAMINATE AND LIGHT DIFFUSION CONTROL FILM

TECHNICAL FIELD

The present invention relates to a light diffusion control film capable of diffusing or transmitting the incident light depending on the incident angle and relates also to a laminate including the light diffusion control film.

BACKGROUND ART

In recent years, light diffusion control films capable of diffusing or transmitting the incident light depending on the incident angle have been known. The use of such light diffusion control films is studied, for example, for a viewing angle control film that is attached to a window glass, a touch panel of a cash dispenser, or the like to protect privacy, a light control film of a reflective liquid crystal display, etc. The use of the above-described light diffusion control films is also studied for a display body using external light, specifically for a signboard or an indicator. Such a display body using external light is configured, for example, such that characters or images are printed on a surface having light diffusion characteristics or on a specular reflection surface or a transparent or semi-transparent film on which characters or images are printed is attached to a surface having light diffusion characteristics or to a specular reflection surface.

An example of the light diffusion control film as described above has an internal structure in the film. The internal structure includes a plurality of regions having a relatively high refractive index in a region having a relatively low refractive index. More specifically, an existing light diffusion control film has a louver structure in which a plurality of plate-like regions having different refractive indices is alternately arranged in one arbitrary direction along the film surface. Another existing light diffusion control film has a column structure in which a plurality of columnar bodies having a relatively high refractive index is densely arranged to stand in a region having a relatively low refractive index.

Patent Document 1 discloses a light diffusion control film as described above, which is obtained by curing a resin composition for light diffusion control films. The resin composition contains a predetermined urethane (meth)acrylate compound, a predetermined (meth)acrylic ester compound having an aromatic skeleton, and a predetermined photopolymerization initiator.

PRIOR ART DOCUMENTS

Patent Documents

[Patent Document 1] JP6414883B

SUMMARY OF THE INVENTION

Problems to be Solved by the Invention

The present inventors have found that the above light diffusion control film undergoes liquefaction under a certain condition. An object of the present invention is therefore to provide a light diffusion control film and a laminate including the light diffusion control film in which the liquefaction is suppressed.

To achieve the above object, first, the present invention provides a laminate used under an environment irradiated with external light, the laminate comprising: a light diffusion control film having an internal structure in the film, the internal structure comprising a plurality of regions having a relatively high refractive index in a region having a relatively low refractive index; and an ultraviolet absorbing layer located further on an external light incident side than the light diffusion control film, the light diffusion control film having an indentation elastic modulus of 30 MPa or more as measured at a maximum load of 2 mN by a nanoindentation method (Invention 1).

In the laminate according to the above invention (Invention 1), the light diffusion control film has the above indentation elastic modulus thereby to suppress the liquefaction of the above light diffusion control film even when the laminate is used over time under an external light irradiation environment (even when the light diffusion control film is irradiated with weak ultraviolet rays for a long time).

In the above invention (Invention 1), the light diffusion control film may preferably contain a hindered amine-based compound (Invention 2).

In the above invention (Invention 1, 2), the light diffusion control film may preferably contain an ultraviolet absorber (Invention 3).

In the above invention (Invention 1 to 3), the ultraviolet absorbing layer may preferably have a light transmittance of 30% or less at a wavelength of 380 nm (Invention 4).

In the above invention (Invention 1 to 4), the laminate may be preferably a window film (Invention 5).

In the above invention (Invention 5), ultraviolet absorbing layers may be preferably provided on both sides of the light diffusion control film (Invention 6).

In the above invention (Invention 1 to 4), the laminate may be preferably a display body using external light (Invention 7).

Second, the present invention provides a light diffusion control film used in a laminate used under an environment irradiated with external light, the laminate comprising the light diffusion control film and an ultraviolet absorbing layer located further on an external light incident side than the light diffusion control film, the light diffusion control film having an internal structure in the film, the internal structure comprising a plurality of regions having a relatively high refractive index in a region having a relatively low refractive index, the light diffusion control film having an indentation elastic modulus of 30 MPa or more as measured at a maximum load of 2 mN by a nanoindentation method (Invention 8).

Advantageous Effect of the Invention

According to the light diffusion control film and laminate of the present invention, liquefaction of the light diffusion control film is suppressed.

EMBODIMENTS FOR CARRYING OUT THE INVENTION

Figure 1:
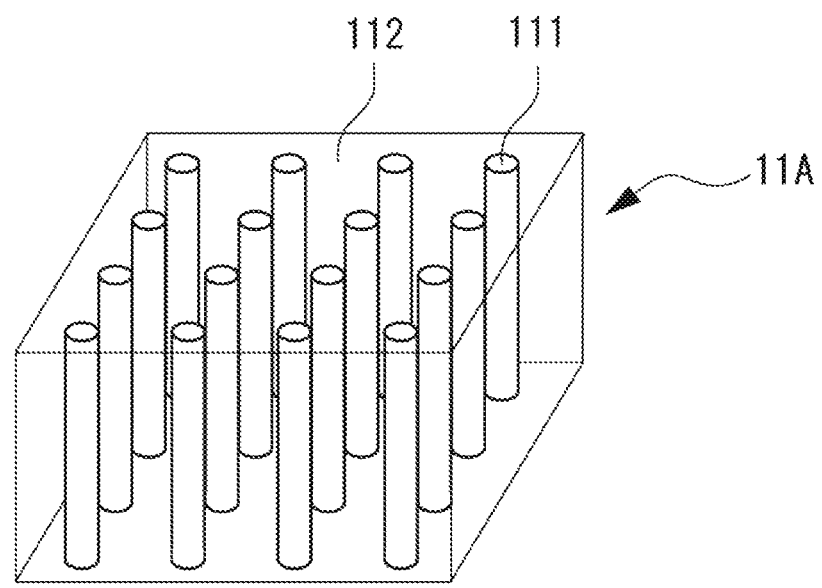
FIG. 1 is a schematic perspective view of an internal structure (column structure) in the light diffusion control film according to an embodiment of the present invention.

Hereinafter, one or more embodiments of the present invention will be described.

<Light Diffusion Control Film>

The light diffusion control film according to an embodiment of the present invention is used in a laminate, which will be described later. The laminate is used under an environment irradiated with external light and includes the light diffusion control film and an ultraviolet absorbing layer located further on the external light incident side than the light diffusion control film. The light diffusion control film according to the present embodiment has an internal structure in the film. The internal structure includes a plurality of regions having a relatively high refractive index in a region having a relatively low refractive index. The light diffusion control film has an indentation elastic modulus of 30 MPa or more as measured at a maximum load of 2 mN by a nanoindentation method. The above internal structure may be preferably a regular internal structure, which will be described later in detail.

The present inventors have found that when a conventional light diffusion control film is used in the above laminate, the light diffusion control film undergoes liquefaction due to the use over time under an external light irradiation environment. It appears that due to the separation between the high refractive index regions and the low refractive index region, the amount of chemical bonds between the high and low refractive index regions is smaller than that of a uniform film that does not have the above internal structure. In the light diffusion control film according to the present embodiment, the indentation elastic modulus is defined as above thereby to suppress the liquefaction even when the light diffusion control film is used in the above laminate over time under an external light irradiation environment (even when the light diffusion control film is irradiated with weak ultraviolet rays for a long time). This appears to be because by increasing the indentation elastic modulus of the light diffusion control film to a certain extent, the cohesive strength of the film as a whole can suppress the liquefaction even when the ultraviolet rays cause partial breakage of the chemical bonds in a microscopic viewpoint.

Here, the "external light" in the present specification refers to light incident on an object (the laminate herein) from outside the object and includes direct sunlight, skylight, reflected light from a feature, and light from various illuminators as well as light having passed through a translucent member such as glass or plastic.

From the viewpoint of the effect of suppressing the above liquefaction, the indentation elastic modulus of the light diffusion control film according to the present embodiment may have to be 30 MPa or more and may be preferably 40 MPa or more, more preferably 45 MPa or more, particularly preferably 50 MPa or more, and further preferably 58 MPa or more. On the other hand, from the viewpoint of easy winding, the above indentation elastic modulus may be preferably 10,000 MPa or less, more preferably 1,000 MPa or less, particularly preferably 500 MPa or less, and further preferably 200 MPa or less. Details of a method of measuring the indentation elastic modulus are as described in the testing example, which will be described later.

The light diffusion control film according to the present embodiment may be preferably obtained by curing a composition that contains a high refractive index component, a low refractive index component having a refractive index lower than that of the high refractive index component, and a polyfunctional monomer that is not contained neither in the high refractive index component nor in the low refractive index component (this composition will be referred to as a "light diffusion control composition C," hereinafter). Additionally or alternatively, each of the high refractive index component and the low refractive index component may preferably have one or two polymerizable functional groups. The use of such a light diffusion control composition C allows the above indentation elastic modulus to be readily satisfied and also allows the regular internal structure, which will be described later, to be readily and satisfactorily formed.

The above polyfunctional monomer may be preferably one that reacts with and binds to the high refractive index component or the low refractive index component in which the molecular chains are readily broken when irradiated with weak ultraviolet rays for a long time. As an example, the high refractive index component or the low refractive index component may preferably contain a component having an ether bond, and the component having an ether bond may be preferably polyether urethane (meth)acrylate. When the light diffusion control film is irradiated with weak ultraviolet rays for a long time, it is considered that the molecular chains in the above component, particularly the ether bond portions are broken, and in the prior art, the component may be segmentalized to readily cause the liquefaction. In the light diffusion control film obtained by curing the above light diffusion control composition C, the polyfunctional monomer reacts with and binds to the high refractive index component or the low refractive index component, preferably the component having an ether bond, and particularly preferably the polyether urethane (meth)acrylate. Accordingly, even when the ether bond portions in the above component are broken, it is expected that the component is anchored by a component derived from the polyfunctional monomer to prevent the segmentalization, and the occurrence of liquefaction is thus effectively suppressed. Note, however, that the present invention is not limited to the above components.

The following description will be made for a case in which the light diffusion control composition C contains the high refractive index component, the low refractive index component having a refractive index lower than that of the high refractive index component, and the polyfunctional monomer and each of the high refractive index component and the low refractive index component has one or two polymerizable functional groups, but the present invention is not limited to this.

1. Components
(1) High Refractive Index Component

Preferred examples of the above high refractive index component include (meth)acrylic ester that contains an aromatic ring, and (meth)acrylic ester that contains a plurality of aromatic rings may be particularly preferred. Examples of the (meth)acrylic ester that contains a plurality of aromatic rings include those in which a part thereof is substituted with halogen, alkyl, alkoxy, alkyl halide, or the like, such as biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, and benzylphenyloxyalkyl (meth)acrylate. Among these, biphenyl (meth)

acrylate may be preferred from the viewpoint of readily forming a satisfactory regular internal structure. Specifically, o-phenylphenoxyethyl acrylate, o-phenylphenoxyethoxyethyl acrylate, and the like may be preferred. In the present specification, (meth)acrylic acid means both the acrylic acid and the methacrylic acid. The same applies to other similar terms.

The molecular weight (weight-average molecular weight) of the high refractive index component may be preferably 2,500 or less, particularly preferably 1,500 or less, and further preferably 1,000 or less. From another aspect, the molecular weight (weight-average molecular weight) of the high refractive index component may be preferably 150 or more, particularly preferably 200 or more, and further preferably 250 or more. When the molecular weight (weight-average molecular weight) of the high refractive index component falls within the above range, the light diffusion control film having a desired regular internal structure can be readily formed. When the theoretical molecular weight of the above high refractive index component can be specified based on the molecular structure, the molecular weight (weight-average molecular weight) of the high refractive index component refers to the theoretical molecular weight (molecular weight that may not be the weight-average molecular weight). On the other hand, when it is difficult to specify the above-described theoretical molecular weight due to the above high refractive index component being a polymer component, for example, the molecular weight (weight-average molecular weight) of the high refractive index component refers to a weight-average molecular weight obtained as a standard polystyrene-equivalent value that is measured using a gel permeation chromatography (GPC) method. As used in the present specification, the weight-average molecular weight refers to a value that is measured as the standard polystyrene equivalent value using the GPC method.

The refractive index of the high refractive index component may be preferably 1.45 or more, more preferably 1.50 or more, particularly preferably 1.54 or more, and further preferably 1.56 or more. From another aspect, the refractive index of the high refractive index component may be preferably 1.70 or less, particularly preferably 1.65 or less, and further preferably 1.59 or less. When the refractive index of the high refractive index component falls within the above range, the light diffusion control film having a desired regular internal structure and desired light diffusion control ability can be readily formed. As used in the present specification, the refractive index means the refractive index of a certain component before curing the light diffusion control composition C, and the refractive index is measured in accordance with JIS K0062: 1992.

The content of the high refractive index component in the light diffusion control composition C may be preferably mass parts or more, particularly preferably 40 mass parts or more, and further preferably 50 mass parts or more with respect to 100 mass parts of the low refractive index component. From another aspect, the content of the high refractive index component in the light diffusion control composition C may be preferably 400 mass parts or less, particularly preferably 300 mass parts or less, and further preferably 200 mass parts or less with respect to 100 mass parts of the low refractive index component. When the content of the high refractive index component falls within such ranges, the regions derived from the high refractive index component and the region derived from the low refractive index component exist with a desired ratio in the regular internal structure of the light diffusion control film formed. As a result, the light diffusion control film having a desired regular internal structure can be readily formed.

(2) Low Refractive Index Component

Preferred examples of the above low refractive index component include urethane (meth)acrylate, a (meth)acrylic-based polymer having a (meth)acryloyl group in a side chain, a (meth)acryloyl group-containing silicone resin, and an unsaturated polyester resin, but it may be particularly preferred to use urethane (meth)acrylate.

The above urethane (meth)acrylate may be preferably formed of (a) a compound that contains at least two isocyanate groups, (b) polyalkylene glycol, and (c) hydroxyalkyl (meth)acrylate.

Preferred examples of the above (a) compound that contains at least two isocyanate groups include aromatic polyisocyanates such as 2,4-tolylene diisocyanate, 2,6-tolylene diisocyanate, 1,3-xylylene diisocyanate, and 1,4-xylylene diisocyanate, aliphatic polyisocyanates such as hexamethylene diisocyanate, alicyclic polyisocyanates such as isophorone diisocyanate (IPDI) and hydrogenated diphenylmethane diisocyanate, biuret bodies and isocyanurate bodies thereof, and adduct bodies (e.g., a xylylene diisocyanate-based trifunctional adduct body) that are reaction products with low molecular active hydrogen-containing compounds such as ethylene glycol, propylene glycol, neopentyl glycol, trimethylol propane, and castor oil. Among these, an alicyclic polyisocyanate may be preferred, and an alicyclic diisocyanate that contains only two isocyanate groups may be particularly preferred.

Preferred examples of the above (b) polyalkylene glycol include polyethylene glycol, polypropylene glycol, polybutylene glycol, and polyhexylene glycol, among which polypropylene glycol may be preferred.

The weight-average molecular weight of the (b) polyalkylene glycol may be preferably 2,300 or more, particularly preferably 3,000 or more, and further preferably 4,000 or more. From another aspect, the weight-average molecular weight of the (b) polyalkylene glycol may be preferably 19,500 or less, particularly preferably 14,300 or less, and further preferably 12,300 or less.

Preferred examples of the above (c) hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Synthesis of the urethane (meth)acrylate using the above-described components (a) to (c) as the materials can be performed in a commonly-used method. In such a method, from the viewpoint of efficiently synthesizing the urethane (meth)acrylate, the compounding ratio of the components (a), (b), and (c) as the molar ratio may be preferably a ratio of 1-5:1:1-5 and particularly preferably a ratio of 1-3:1:1-3.

The weight-average molecular weight of the low refractive index component may be preferably 3,000 or more, particularly preferably 5,000 or more, and further preferably 7,000 or more. From another aspect, the weight-average molecular weight of the low refractive index component may be preferably 20,000 or less, particularly preferably 15,000 or less, and further preferably 13,000 or less. When the weight-average molecular weight of the low refractive index component falls within the above range, the light diffusion control film having a desired regular internal structure can be readily formed.

The refractive index of the low refractive index component may be preferably 1.59 or less, more preferably 1.50 or less, particularly preferably 1.49 or less, and further preferably 1.48 or less. From another aspect, the refractive index of the low refractive index component may be preferably 1.30 or more, particularly preferably 1.40 or more, and particularly preferably 1.46 or more. When the refractive index of the low refractive index component falls within the above range, the light diffusion control film having a desired regular internal structure and desired light diffusion control ability can be readily formed.

(3) Polyfunctional Monomer

The polyfunctional monomer in the present embodiment may be one that is not contained neither in the high refractive index component nor in the low refractive index component, which are previously described. This polyfunctional monomer may be a component that increases the cohesive strength of the obtained pressure sensitive adhesive and also increases the indentation elastic modulus. Such a polyfunctional monomer may be preferably a polyfunctional acrylate-based monomer.

From the viewpoint of the effect of suppressing liquefaction of the light diffusion control film, the polyfunctional acrylate-based monomer may be preferably a polyfunctional acrylate-based monomer having 3 or more polymerizable functional groups, particularly preferably a polyfunctional acrylate-based monomer having 4 or more polymerizable functional groups, and further preferably a polyfunctional acrylate-based monomer having 5 or more polymerizable functional groups. On the other hand, from the viewpoint of preventing the film warpage during production, the polyfunctional acrylate-based monomer may be preferably a polyfunctional acrylate-based monomer having 30 or less polymerizable functional groups, more preferably a polyfunctional acrylate-based monomer having or less polymerizable functional groups, and particularly preferably a polyfunctional acrylate-based monomer having 8 or less polymerizable functional groups.

Additionally or alternatively, from the viewpoint of compatibility with the previously described high refractive index component and low refractive index component, the polyfunctional acrylate-based monomer may preferably have a molecular weight of less than 1,000.

Specifically, examples of the polyfunctional acrylate-based monomer include: trifunctional monomers such as trimethylolpropane tri(meth)acrylate, dipentaerythritol tri(meth)acrylate, propionic acid-modified dipentaerythritol tri(meth)acrylate, pentaerythritol tri(meth)acrylate, ethoxylated isocyanuric acid tri(meth)acrylate, propylene oxide-modified trimethylolpropane tri(meth)acrylate, tris-(2-(meth)acryloxyethyl) isocyanurate, and ε-caprolactone-modified tris-(2-(meth)acryloxyethyl) isocyanurate; tetrafunctional monomers such as diglycerin tetra(meth)acrylate and pentaerythritol tetra(meth)acrylate; pentafunctional monomers such as propionic acid-modified dipentaerythritol penta(meth)acrylate; and hexafunctional monomers such as dipentaerythritol hexa(meth)acrylate and caprolactone-modified dipentaerythritol hexa(meth)acrylate. These may each be used alone or two or more types may also be used in combination.

The content of the polyfunctional monomer in the light diffusion control composition C may be preferably 0.1 mass % or more, more preferably 1 mass % or more, particularly preferably 2 mass % or more, and further preferably 3 mass % or more. This allows the previously described indentation elastic modulus to be readily satisfied. From another aspect, the content of the polyfunctional monomer may be preferably 30 mass % or less, more preferably 20 mass % or less, particularly preferably 10 mass % or less, and further preferably 6 mass % or less. This allows the obtained light diffusion control film to have a wide variable haze angle range.

(4) Hindered Amine-Based Compound

The light diffusion control composition C may also preferably further contain a hindered amine-based compound. This can prevent the breakage of the molecular chains, in particular the ether bonds, in the film constituents even when the light diffusion control film is irradiated with weak ultraviolet rays for a long time, and the effect of suppressing liquefaction of the light diffusion control film becomes more excellent.

The hindered amine refers to an amine that has substituents on both sides of an amino group. The hindered amine-based compound in the present embodiment may be preferably a compound that includes at least one skeleton represented by the following general formula (I).

[Chemical Formula 1]

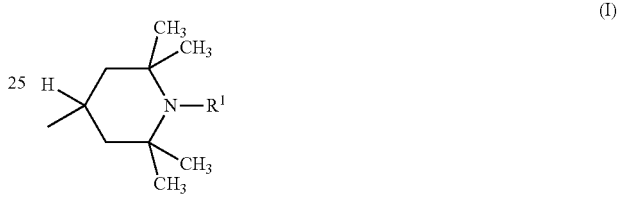

(I)

(In the formula, $R^1$ represents a hydrogen atom or an alkyl group.)

In the hindered amine-based compound in the present embodiment, $R^1$ in the above general formula (I) may be preferably an alkyl group, particularly preferably an alkyl group whose carbon number is 1 to 4, and further preferably a methyl group.

The hindered amine-based compound in the present embodiment may preferably have one to ten skeletons represented by the above general formula (I), particularly preferably have one to four skeletons, and further preferably have one or two skeletons. The one or more skeletons represented by the above general formula (I) may be present at one or more terminals of the hindered amine-based compound, at one or more side chains, or at one or more terminals and one or more side chains.

When the hindered amine-based compound has two or more skeletons represented by the above general formula (I), each $R_1$ may be the same or may also be different.

When the hindered amine-based compound is used, the content of the hindered amine-based compound in the light diffusion control composition C may be preferably 0.001 mass % or more, more preferably 0.01 mass % or more, particularly preferably 0.1 mass % or more, and further preferably 0.15 mass % or more. This allows the light diffusion control film to have more excellent effect of suppressing the liquefaction. From another aspect, the content of the hindered amine-based compound may be preferably 10 mass % or less, more preferably 2 mass % or less, particularly preferably 0.7 mass % or less, and further preferably 0.3 mass % or less. This allows the obtained light diffusion control film to have a wide variable haze angle range.

(5) Ultraviolet Absorber

The light diffusion control composition C may also preferably further contain an ultraviolet absorber. This allows the light diffusion control film to have more excellent effect of suppressing the liquefaction.

Examples of the ultraviolet absorber include benzophenone-based compounds, benzotriazole-based compounds, triazine-based compounds, cyanoacrylate-based compounds, and salicylic esters, and one type may be used alone or two or more types may be used in combination. Among the above, the benzophenone-based compounds, benzotriazole-based compounds, or triazine-based compounds may be preferred, and the benzotriazole-based compounds may be particularly preferred. These compounds have good compatibility with the previously described high refractive index component and low refractive index component and also have a low degree of coloring.

Preferred examples of the benzophenone-based compounds include 2,2-dihydroxy-4-methoxybenzophenone, 2,4-dihydroxybenzophenone, 2-hydroxy-4-methoxybenzophenone, 2-hydroxy-4-methoxybenzophenone-5-sulfonic acid hydrate, and 2-hydroxy-4-n-octyloxybenzophenone. Preferred examples of the benzotriazole-based compounds include 2-(2-hydroxy-5-t-butylphenyl)-2H-benzotriazole, octyl-3-[3-t-butyl-4-hydroxy-5-(5-chloro-2H-benzotriazole-2-yl) phenyl] propionate, 2-ethylhexyl-3-[3-t-butyl-4-hydroxy-5-(5-chloro-2H-benzotriazole-2-yl) phenyl] propionate, and benzenepropanoic acid-3-(2H-benzotriazole-2-yl)-5-(1,1-dimethylethyl)-4-hydroxy-alkyl ester. Preferred examples of the triazine-based compounds include 2,4-bis[2-hydroxy-4-butoxyphenyl]-6-(2,4-dibutoxyphenyl)-1,3,5-triazine and 2-[4,6-di(2,4-xylyl)-1,3,5-triazine-2-yl]-5-octyloxyphenol. These may each be used alone or two or more types may also be used in combination.

When the ultraviolet absorber is used, the content of the ultraviolet absorber in the light diffusion control composition C may be preferably 0.001 mass % or more, more preferably 0.01 mass % or more, particularly preferably 0.02 mass % or more, and further preferably 0.06 mass % or more. This allows the light diffusion control film to have more excellent effect of suppressing the liquefaction. From another aspect, the content of the ultraviolet absorber may be preferably 5 mass % or less, more preferably 1 mass % or less, particularly preferably 0.5 mass % or less, and further preferably 0.1 mass % or less. This allows the curing of the light diffusion control composition C by ultraviolet irradiation to progress without any problem.

(6) Other Components

The previously described light diffusion control composition C may contain other additives in addition to the above components. Examples of the other additives include a photopolymerization initiator, an antioxidant, an antistatic, a polymerization accelerator, a polymerization inhibitor, an infrared absorber, a plasticizer, and a leveling agent.

Among the above-described additives, a photopolymerization initiator may be preferably contained in the light diffusion control composition C. When the light diffusion control composition C contains a photopolymerization initiator, the light diffusion control film having a desired regular internal structure can be readily and efficiently formed.

Examples of the photopolymerization initiator include benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminebenzoic ester, and oligo[2-hydroxy-2-methyl-1-[4-(1-methylvinyl)phenyl] propane]. These may each be used alone or two or more types may also be used in combination.

When the photopolymerization initiator is used, the content of the photopolymerization initiator in the light diffusion control composition C may be preferably 0.2 mass parts or more, particularly preferably 0.5 mass parts or more, and further preferably 1 mass part or more with respect to 100 mass parts of the total amount of the high refractive index component and the low refractive index component. From another aspect, the content of the photopolymerization initiator may be preferably 20 mass parts or less, particularly preferably 15 mass parts or less, and further preferably 10 mass parts or less with respect to 100 mass parts of the total amount of the high refractive index component and the low refractive index component. When the content of the photopolymerization initiator in the light diffusion control composition C falls within the above range, the light diffusion control film can be readily and efficiently formed.

Additionally or alternatively, the light diffusion control composition C may preferably contain an antioxidant. When the light diffusion control composition C contains an antioxidant, deterioration of the previously described hindered amine-based compound may be prevented, and the light resistance may be particularly excellent for a long period of time.

Examples of the antioxidants include: hindered phenol compounds such as triethylene glycol-bis[3-(3-t-butyl-5-methyl-4-hydroxyphenyl) propionate], pentaerythrityl-tetrakis[3-(3,5-di-t-butyl-4-hydroxyphenyl) propionate], 2,2-thio-diethylenebis[3-(3,5-di-t-butyl-4-hydroxyphenyl) propionate], and n-octadecyl-3-(4'-hydroxy-3',5'-di-t-butylphenyl) propionate; and phosphite ester compounds such as tris(2,4-di-t-butylphenyl) phosphite, 2,2-methylenebis(4,6-di-t-butylphenyl) octylphosphite, bis(2,6-di-t-butylphenyl) pentaerythritol-di-phosphite, and tetrakis(2,4-di-t-butylphenyl)4,4'-biphenylene-di-phosphonite. These may each be used alone or two or more types may also be used in combination.

When the antioxidant is used, from the previously described viewpoint, the content of the antioxidant in the light diffusion control composition C may be preferably 0.001 mass % or more, more preferably 0.01 mass % or more, particularly preferably 0.02 mass % or more, and further preferably 0.03 mass % or more. From another aspect, the content of the antioxidant may be preferably 1 mass % or less, more preferably 0.5 mass % or less, particularly preferably 0.1 mass % or less, and further preferably 0.08 mass % or less. This can prevent a decrease in the variable haze angle range.

2. Preparation of Light Diffusion Control Composition

The light diffusion control composition C can be prepared by uniformly mixing the previously described high refractive index component, low refractive index component, and polyfunctional monomer and, if desired, other additives such as a hindered amine-based compound, an ultraviolet absorber, a photopolymerization initiator, and an antioxidant.

In the above mixing, a uniform light diffusion control composition C may be obtained by stirring it while heating it to a temperature of 40° C. to 80° C. A diluting solvent may be added and mixed so that the obtained light diffusion control composition C has a desired viscosity.

3. Internal Structure of Light Diffusion Control Film

The internal structure of the light diffusion control film in the present embodiment includes a plurality of regions having a relatively high refractive index in a region having a relatively low refractive index. This allows the light diffusion control film to diffuse or transmit the incident light depending on the incident angle.

The internal structure of the light diffusion control film in the present embodiment may be preferably a regular internal structure. Specifically, the internal structure may be preferably a regular internal structure in which a plurality of regions having a relatively high refractive index extends with a predetermined length in the film thickness direction in a region having a relatively low refractive index. Such a regular internal structure may have a feature that the regions having a relatively high refractive index extend in the film thickness direction, and this feature is distinguished from those of a phase-separation structure in which one phases exist in the other phase without clear regularity and a sea-island structure in which approximately spherical island components exist in a sea component.

An example of the above regular internal structure may be a column structure in which a plurality of columnar bodies having a relatively high refractive index is densely arranged to stand in a region having a relatively low refractive index. Another example may be a louver structure in which a plurality of plate-like regions having different refractive indices is alternately arranged in one arbitrary direction along the film surface.

(1) Column Structure

FIG. 1 is a perspective view schematically illustrating the above column structure. As illustrated in FIG. 1, the column structure 11A may be a structure in which a plurality of columnar bodies 111 having a relatively high refractive index is densely arranged to stand in the thickness direction and the surroundings thereof are filled with a region 112 having a relatively low refractive index. FIG. 1 depicts the columnar bodies 111 as existing in the entire thickness direction in the column structure 11A, but the columnar bodies 111 may not exist at least in one of the upper end part and lower end part of the column structure 11A in the thickness direction.

When light incident on the light diffusion control film having such a column structure 11A falls within a predetermined incident angle range, the light exits the light diffusion control film while being strongly diffused with a predetermined opening angle. On the other hand, when the incident light falls outside the above incident angle range, the incident light transmits through the light diffusion control film without being diffused or exits the light diffusion control film with weaker diffusion than that in the case of the incident light within the incident angle range. When an image creating body is arranged parallel to the surface of the light diffusion control film, the diffused light caused by the column structure 11A is in a circular shape or an approximately circular shape (such as an elliptical shape) spreading in any direction. On the other hand, in the case of the above weak diffusion due to the incident light outside the above incident angle range, the diffused light is in a crescent shape.

In the column structure 11A, the difference between the refractive index of the columnar bodies 111 having a relatively high refractive index and the refractive index of the region 112 having a relatively low refractive index may be preferably 0.01 to 0.3.

Preferably, the above-described columnar bodies 111 may have a structure in which the diameter increases from one surface of the light diffusion control film to the other surface. The columnar bodies 111 having such a structure may readily change the traveling direction of light parallel to the axial direction of the columnar bodies as compared with columnar bodies in which the diameter does not substantially change from one surface to the other surface. This allows the light diffusion control film to effectively diffuse light.

The maximum value of the diameter in the cross sections when the columnar bodies 111 are cut along a horizontal plane with respect to the axial direction may be preferably 0.1 to 10 µm. The cross-sectional shape of the columnar bodies 111 when cut along a plane perpendicular to the axial direction is not particularly limited, but may be preferably, for example, a circle, an ellipse, a polygonal shape, an irregular shape, or other similar shape.

In the column structure 11A, the distance between adjacent columnar bodies 111 may be preferably 0.1 to 10 µm.

In the column structure 11A, the columnar bodies 111 may be densely arranged to stand parallel to the thickness direction of the light diffusion control film or may also be densely arranged to stand at a certain tilt angle. The tilt angle when the columnar bodies 111 are densely arranged to stand at a certain tilt angle, that is, an angle on the acute angle side formed between the axis of each columnar body 111 of the column structure 11A and the normal line of the surface of the light diffusion control film, may be preferably 1° to 50°.

The dimensions, predetermined angle, and other parameters relating to the regular internal structure of the column structure 11A described above can be measured by observing the cross section of the column structure 11A using an optical digital microscope.

(2) Louver Structure

Figure 2:
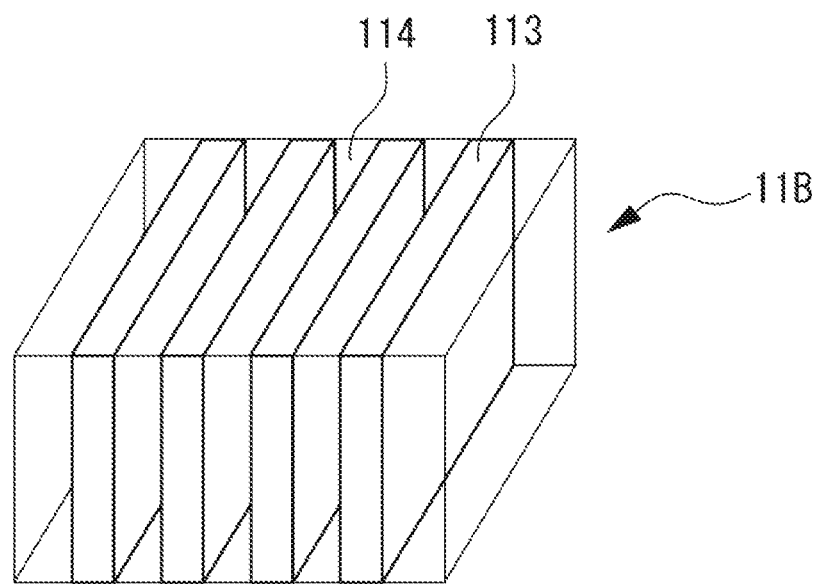
FIG. 2 is a schematic perspective view of an internal structure (louver structure) in the light diffusion control film according to another embodiment of the present invention.

FIG. 2 is a perspective view schematically illustrating the above louver structure. As illustrated in FIG. 2, the louver structure 11B may be a structure in which plate-like regions 113 having a relatively high refractive index are alternately arranged in one direction along the film surface and spaces therebetween are filled with regions 114 having a relatively low refractive index. FIG. 2 depicts the plate-like regions 113 as existing in the entire thickness direction in the louver structure 11B, but the plate-like regions 113 may not exist at least in one of the upper end part and lower end part of the louver structure 11B in the thickness direction.

Light incident on the light diffusion control film having such a louver structure 11B exits the light diffusion control film while being diffused or transmits through the light diffusion control film without being diffused, depending on the incident angle. The light diffusion control film having the louver structure 11B has a property that the diffusion is likely to occur in a direction perpendicular to the extending direction of the plate-like regions 113 along the film surface.

In the louver structure 11B, the difference between the refractive index of the plate-like regions 113 having a relatively high refractive index and the refractive index of the regions 114 having a relatively low refractive index may be preferably 0.01 to 0.3.

In the louver structure 11B, the thickness (width in the arrangement direction) of each plate-like region 113 may be preferably 0.1 to 10 µm.

In the louver structure 11B, the plate-like regions 113 may be tilted with respect to the film normal direction in the extending in the film thickness direction or may also coincide with the film normal direction without any tilt. The tilt angle when the extending of the plate-like regions 113 in the film thickness direction is tilted, that is, an angle on the acute angle side formed between one surface of each plate-like region 113 and the normal line of the light diffusion control film, may be preferably 1° to 60°.

The dimensions, predetermined angle, and other parameters relating to the internal structure of the louver structure 11B described above can be measured by observing the cross section of the louver structure 11B using an optical digital microscope.

(3) Other Internal Structures

The internal structure of the light diffusion control film according to the present embodiment may be a structure other than the above-described column structure 11A and louver structure 11B. For example, the light diffusion control film may have, as the internal structure, a structure in which the columnar bodies 111 in the above-described column structure 11A are bent at the middle in the thickness direction of the light diffusion control film. Moreover, the light diffusion control film may have, as the internal structure, a structure in which the plate-like regions 113 in the above-described louver structure 11B are bent at the middle in the thickness direction of the light diffusion control film. Furthermore, the internal structure of the light diffusion control film according to the present embodiment may be a structure in which the regions of the columnar bodies 111 or the plate-like regions 113 are each provided as two or more portions so as to have different tilt angles, different bending angles, or difference in the presence or absence of bending. Alternatively, the light diffusion control film according to the present embodiment may have an internal structure in which two or more of the column structure 11A, the louver structure 11B, and the above-described bent structure are arbitrarily combined and laminated.

(4) Ratio of Internal Structure in Thickness Direction of Light Diffusion Control Film As described previously, the light diffusion control film according to the present embodiment may preferably have an internal structure in which a plurality of regions having a relatively high refractive index is provided to extend in the thickness direction in a region of the film having a relatively low refractive index. Here, the ratio of the internal structure extending in the thickness direction may be preferably 10% or more, more preferably 30% or more, and particularly preferably 50% or more from the viewpoint of making the light diffusivity more efficient. The upper limit of the ratio is not limited and may be 100%, that is, the internal structure may be formed in the whole length in the thickness direction.

4. Physical Properties and Other Properties of Light Diffusion Control Film (1) Thickness The thickness of the light diffusion control film according to the present embodiment may be preferably 20 μm or more, particularly preferably 40 μm or more, and further preferably 60 μm or more as the lower limit. When the lower limit of the thickness of the light diffusion control film falls within the above range, the light diffusion control film may readily exhibit desired light diffusion control ability. From another aspect, the thickness of the light diffusion control film may be preferably 700 μm or less, particularly preferably 400 μm or less, and further preferably 200 μm or less as the upper limit. When the upper limit of the thickness of the light diffusion control film falls within the above range, the occurrence of dents and/or collapse can be readily suppressed.

(2) Variable Haze Angle Range

When the internal structure in the light diffusion control film is the previously described column structure 11A or its modified structure, the angle range (variable haze angle range) of an incident angle that gives a haze value equal to or more than a threshold may be preferably 5° to 100°. The threshold is set to 90% of the maximum haze value measured when one surface of the diffusion film is irradiated with light rays at an incident angle of −70° to 70° with respect to the normal direction of the surface being 0°.

When the internal structure in the light diffusion control film is the previously described louver structure 11B or its modified structure, the angle range (variable haze angle range) of an incident angle that gives a haze value equal to or more than a threshold may be preferably 5° or more, particularly preferably 10° or more, and further preferably 30° or more. The threshold is set to 60% of the maximum haze value measured when one surface of the diffusion film is irradiated with light rays at an incident angle of −70° to 70° with respect to the normal direction of the surface being 0°. When the above variable haze angle range is 5° or more, the angle range of incident light that can achieve satisfactory light diffusion control ability is wider. The upper limit of the above variable haze angle range is not particularly limited and may be, for example, 100° or less in an embodiment, 80° or less in a particular embodiment, and 50° or less in a further embodiment.

Details of a method of measuring the above variable haze angle range are as described in the testing example, which will be described later.

5. Method of Manufacturing Light Diffusion Control Film

The method of manufacturing the light diffusion control film according to the present embodiment is not particularly limited, and the light diffusion control film can be manufactured using a conventionally known method. For example, one surface of a process sheet may be coated with a composition for light diffusion control films, preferably the previously described light diffusion control composition C, to form a coating film. The light diffusion control film can be formed by irradiating the above coating film with active energy rays to cure the coating film. Before or after the above irradiation with active energy rays, one surface (in particular, release surface) of a release sheet may be attached to the surface of the above coating film opposite to the process sheet, and the above coating film may be cured by irradiating the above coating film with active energy rays via the process sheet or the release sheet.

Examples of the method for the above coating include a knife coating method, a roll coating method, a bar coating method, a blade coating method, a die coating method, and a gravure coating method. The light diffusion control composition C may be diluted using a solvent as necessary.

The above active energy rays refer to electromagnetic wave or charged particle radiation having an energy quantum, and specific examples of the active energy rays include ultraviolet rays and electron rays. Among the active energy rays, ultraviolet rays may be particularly preferred because of easy management.

Irradiation of the coating film with the active energy rays may be performed in a different mode depending on the internal structure to be formed. For example, when forming the previously described column structure 11A, the coating film may be irradiated with parallel light having a high degree of parallelism of light rays. Here, the parallel light means approximately parallel light that does not spread when the direction of emitted light is viewed from any direction. Such parallel light can be prepared using a known means such as a lens or a light shielding member. During the irradiation, it is preferred to irradiate the laminate of the coating film and the process sheet with the above parallel light while moving the laminate in the longitudinal direction using a conveyor or the like. The tilt angle of the columnar bodies 111 formed in the column structure 11A can be adjusted by adjusting the angle of irradiation with the above parallel light.

When forming the column structure 11A using ultraviolet rays as the active energy rays, it may be preferred to set the irradiation condition such that the peak illuminance on the coating film surface is 0.1 to 50 mW/cm$^2$. The peak illuminance as referred to herein means a measured value at a portion at which the active energy rays irradiating the coating film surface show the maximum value. Additionally or alternatively, it may be preferred to set the integrated light amount on the coating film surface to 5 to 300 mJ/cm$^2$.

When forming the column structure 11A using ultraviolet rays as the active energy rays, the relative moving speed of the light source for the active energy rays with respect to the above laminate may be preferably 0.1 to 10 m/min.

On the other hand, when forming the previously described louver structure 11B, a linear light source may be used as the light source for the active energy rays to irradiate the laminate surface with light randomly in the width direction (TD direction) and with approximately parallel strip-shaped (substantially linear) light in the flow direction (MD direction). The tilt angle of the plate-like regions 113 formed in the louver structure 11B can be adjusted by adjusting the angle of irradiation with the above light.

When forming the louver structure 11B using ultraviolet rays as the active energy rays, the irradiation condition may be the same as in the case of forming the column structure 11A. The relative moving speed of the light source for the active energy rays with respect to the above laminate may also be the same as in the case of forming the column structure 11A.

From the viewpoint of completing more reliable curing, it may also be preferred to perform irradiation with commonly-used active energy rays (active energy rays for which the process of converting the rays into parallel light or strip-shaped light is not performed, scattered light) after performing the curing using the parallel light or the strip-shaped light as previously described. For this operation, a release sheet may be laminated on the coating film surface from the viewpoint of uniform curing.

<Laminate>

The laminate according to an embodiment of the present invention is a laminate used under an environment irradiated with external light. The laminate includes a light diffusion control film having an internal structure in the film. The internal structure includes a plurality of regions having a relatively high refractive index in a region having a relatively low refractive index. The laminate further includes an ultraviolet absorbing layer located further on the external light incident side than the light diffusion control film. The above light diffusion control film has the previously described indentation elastic modulus.

Here, the laminate may include a single layer having the ultraviolet absorbability or may also include a plurality of layers having the ultraviolet absorbability. When a plurality of layers having the ultraviolet absorbability is included and located further on the external light incident side than the light diffusion control film, these layers are collectively referred to as an ultraviolet absorbing layer.

In the laminate having the above configuration, even when it is used over time under an external light irradiation environment, the liquefaction of the light diffusion control film is suppressed and the yellowing of the light diffusion control film is also suppressed. When the ultraviolet absorbing layer does not exist further on the external light incident side than the light diffusion control film, the problem of liquefaction of the light diffusion control film may not occur, and only the yellowing may be the problem.

The light diffusion control film in the laminate according to the present embodiment is the light diffusion control film according to the previously described embodiment.

The light transmittance of the ultraviolet absorbing layer at a wavelength of 380 nm may be preferably 30% or less, more preferably 10% or less, particularly preferably 1% or less, further preferably 0.1% or less, and most preferably 0.05% or less. On the other hand, the lower limit of the light transmittance is not particularly limited and may be preferably 0%. From the viewpoint of balancing with high transmittance in the visible light region, the lower limit of the light transmittance may be preferably 0.001% or more, more preferably 0.005% or more, particularly preferably 0.010% or more, and further preferably 0.015% or more. When the light transmittance of the ultraviolet absorbing layer at a wavelength of 380 nm falls within the above range, the conventional light diffusion control film tends to be liquefied over time under an external light irradiation environment. This appears to be because the light diffusion control film is irradiated with weak ultraviolet rays for a long time to break some molecular chains in the light diffusion control film. On the other hand, according to the present embodiment, when the light transmittance of the ultraviolet absorbing layer at a wavelength of 380 nm falls within the above range, the yellowing of the light diffusion control film can be suppressed, and other member or members of the laminate can be protected from ultraviolet rays.

The ultraviolet absorbing layer in the present embodiment may preferably have high transmissivity for light rays in the visible light region. From this viewpoint, the light transmittance of the ultraviolet absorbing layer at a wavelength of 480 nm may be preferably 60% or more, more preferably 80% or more, particularly preferably 86% or more, and further preferably 90% or more. From the same viewpoint, the light transmittance of the ultraviolet absorbing layer at a wavelength of 580 nm may be preferably 60% or more, more preferably 80% or more, particularly preferably 86% or more, and further preferably 90% or more. On the other hand, the upper limit of the light transmittance at a wavelength of 480 nm and the upper limit of the light transmittance at a wavelength of 580 nm of the ultraviolet absorbing layer are not particularly limited and may be preferably 100%. From the viewpoint of balancing with low transmittance in the ultraviolet light region, the above upper limits may be preferably 99% or less and particularly preferably 98% or less.

The ultraviolet absorbing layer may be composed of one or more pressure sensitive adhesive layers that contain an ultraviolet absorber or may also be composed of one or more plastic films that contain an ultraviolet absorber. Alternatively, the ultraviolet absorbing layer may be a combination of such layers.

When the ultraviolet absorbing layer is a pressure sensitive adhesive layer that contains an ultraviolet absorber, the type of a pressure sensitive adhesive that constitutes the pressure sensitive adhesive layer is not particularly limited, and conventionally known ones can be used. Examples of the pressure sensitive adhesive for use include an acrylic-based pressure sensitive adhesive, a silicone-based pressure sensitive adhesive, a urethane-based pressure sensitive adhesive, and a rubber-based pressure sensitive adhesive, among which the acrylic-based pressure sensitive adhesive may be preferred because it can readily achieve satisfactory pressure sensitive adhesive property and transparency. The type of plastic is also not particularly limited when used for the plastic film that contains an ultraviolet absorber, and conventionally known ones can be used.

The ultraviolet absorber of the ultraviolet absorbing layer is not particularly limited, and the same ultraviolet absorber that can be contained in the previously described light diffusion control composition C can be used.

The laminate according to the present embodiment can be used for various purposes in which the control of light diffusion is required under an external light irradiation environment. Examples include a window glass, a display of a cash dispenser, a monitor of a personal computer, a display of a smartphone, a reflective liquid crystal display, and a display body using external light, such as a signboard or an indicator. The laminate can be suitably used for, among the above, a window film attached to a window glass or the like for the purpose of controlling the viewing angle, a display body using external light, or the like.

When the laminate according to the present embodiment is used as a window film to be attached to a window glass, it is also preferred to provide the ultraviolet absorbing layers on both sides of the light diffusion control film. This allows both the ultraviolet rays of sunlight and the ultraviolet rays from an interior lamp to be absorbed, and it is possible to effectively suppress the yellowing of the light diffusion control film and protect a given member from the ultraviolet rays. Even with the above configuration, the conventional light diffusion control film may be liquefied over time.

Here, the physical properties related to the color of the laminate according to the present embodiment will be described.

(1) XYZ (Yxy) Color System

Luminance Y as defined by the CIE1931 XYZ (Yxy) color system of the laminate according to the present embodiment may be preferably 40 or more, particularly preferably 50 or more, and further preferably 60 or more. The upper limit of the luminance Y is not particularly limited and may be 100, but is usually about 90 or less. When the lower limit of the luminance Y of the laminate is the above, the visibility of an object on the other side of the laminate and the visibility of a decorative layer of the laminate are satisfactory. The luminance Y may preferably fall within the above range even after the laminate is irradiated with ultraviolet rays for 1,000 hours (irradiance: 75 to 700 $W/m^2$).

Chromaticity x as defined by the CIE1931 XYZ (Yxy) color system of the laminate according to the present embodiment may be preferably 0.1 or more, particularly preferably 0.2 or more, and further preferably 0.3 or more. From another aspect, the chromaticity x may be preferably 0.8 or less, particularly preferably 0.6 or less, and further preferably 0.4 or less. On the other hand, chromaticity y as defined by the CIE1931 XYZ (Yxy) color system of the laminate according to the present embodiment may be preferably 0.1 or more, particularly preferably 0.2 or more, and further preferably 0.3 or more. From another aspect, the chromaticity y may be preferably 0.8 or less, particularly preferably 0.6 or less, and further preferably 0.4 or less. When the chromaticity x and the chromaticity y of the laminate fall within the above ranges, it can be said that the laminate is less colored and has an excellent degree of colorlessness. The chromaticity x and the chromaticity y may preferably fall within the above ranges even after the laminate is irradiated with ultraviolet rays for 1,000 hours (irradiance: 75 to 700 $W/m^2$).

(2) L*a*b* Color System

Lightness L* as defined by the CIE1976 L*a*b* color system of the laminate according to the present embodiment may be preferably 60 or more, particularly preferably 70 or more, and further preferably 80 or more. On the other hand, the upper limit of the lightness L* is not particularly limited and may be 100, but is usually about 98 or less. When the lower limit of the lightness L* of the laminate is the above, the visibility of an object on the other side of the laminate and the visibility of a decorative layer of the laminate are satisfactory. The lightness L* may preferably fall within the above range even after the laminate is irradiated with ultraviolet rays for 1,000 hours (irradiance: 75 to 700 W/m2).

The absolute value of chromaticity a* as defined by the CIE1976 L*a*b* color system of the laminate according to the present embodiment may be preferably 20 or less, particularly preferably 10 or less, and further preferably 8 or less. The lower limit of the absolute value of the chromaticity a* is not particularly limited and may be preferably 0. On the other hand, the absolute value of chromaticity b* as defined by the CIE1976 L*a*b* color system of the laminate according to the present embodiment may be preferably 40 or less, particularly preferably 30 or less, and further preferably 25 or less. The lower limit of the absolute value of the chromaticity b* is not particularly limited and may be preferably 0. When the upper limit values of the chromaticity and the chromaticity b* of the laminate are the above, it can be said that the laminate is less colored and has excellent colorless transparency. The chromaticity a* and the chromaticity b* may preferably fall within the above ranges even after the laminate is irradiated with ultraviolet rays for 1,000 hours (irradiance: 75 to 700 $W/m^2$).

In the laminate according to the present embodiment, Ab*, which is the difference in the chromaticity b* before and after 1,000 hours of ultraviolet irradiation (irradiance: 75 to 700 $W/m^2$), may be preferably 40 or less, more preferably 30 or less, and particularly preferably 20 or less. When the Ab* falls within the above range, it can be said that the yellowing due to the ultraviolet irradiation is well suppressed.

(3) Yellowness Index/Change of Yellowness Index

The absolute value of the yellowness index YI as defined by JIS K7373: 2006 of the laminate according to the present embodiment may be preferably 60 or less, more preferably 50 or less, and particularly preferably 40 or less. When the absolute value of the yellowness index YI falls within the above range, it can be said that the laminate has a small yellowness index and an excellent degree of colorlessness.

Additionally or alternatively, in the laminate according to the present embodiment, ΔYI, which is the difference in the yellowness index YI before and after irradiation with ultraviolet rays for 1,000 hours (irradiance: 75 to 700 $W/m^2$), may be preferably 50 or less, more preferably 40 or less, and particularly preferably 30 or less. When the ΔYI falls within the above range, it can be said that the yellowing due to ultraviolet irradiation is well suppressed.

Specific examples of the laminate according to the present embodiment will be described below by exemplifying a window film as a viewing angle control film and a display body using external light (e.g., a station name board, or a running in board), but the laminate according to the present invention is not limited thereto.

1. Window Film

Figure 3:
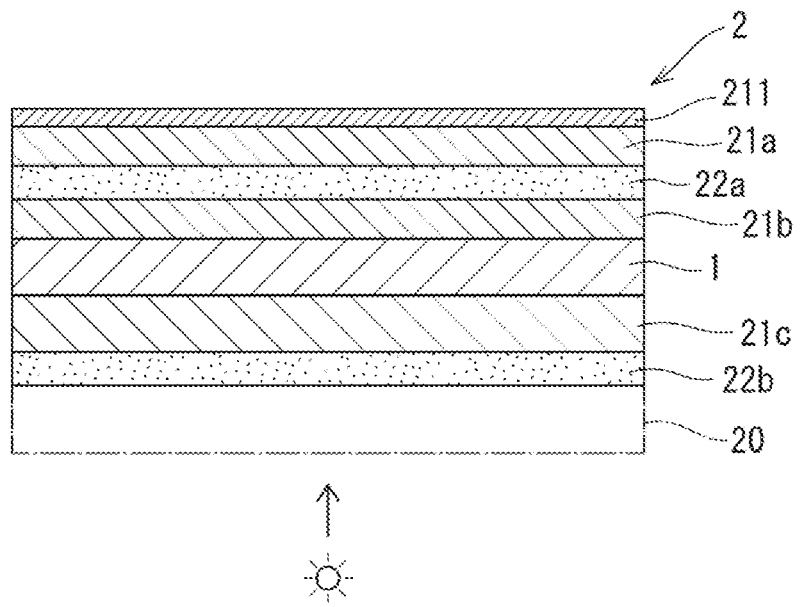
FIG. 3 is a cross-sectional view of the laminate (window film) according to an embodiment of the present invention.

FIG. 3 illustrates a window film as an example of the laminate according to the present embodiment. As illustrated in FIG. 3, the window film 2 in the present embodiment is configured to include a transparent resin film 21a with a hard coat layer 211, a pressure sensitive adhesive layer 22a containing an ultraviolet absorber, a transparent resin film 21b, a light diffusion control film 1, a transparent resin film 21c, and a pressure sensitive adhesive layer 22b containing an ultraviolet absorber in this order from the top of the figure.

The window film 2 in the present embodiment may be attached to a window glass 20 or the like via the pressure sensitive adhesive layer 22b containing an ultraviolet absorber. In the present embodiment, the window film 2 may be attached to the inside of the window glass 20, and sunlight is therefore incident on the window film 2 through the window glass 20. Alternatively, the window film 2 may be attached to the outside of the window glass 20.

The light diffusion control film 1 is the light diffusion control film 1 according to the previously described embodiment. In the window film 2 in the present embodiment, the internal structure of the light diffusion control film 1 may be preferably the louver structure 11B or its modified structure, but is not limited thereto.

In the window film 2 in the present embodiment, the pressure sensitive adhesive layer 22a containing an ultraviolet absorber and the pressure sensitive adhesive layer 22b containing an ultraviolet absorber each correspond to the ultraviolet absorbing layer. That is, in the present embodiment, the ultraviolet absorbing layers exist on both sides of the light diffusion control film 1.

The thicknesses of the pressure sensitive adhesive layers 22a and 22b containing an ultraviolet absorber are not particularly limited, provided that the layers exhibit the desired adhesive strength and satisfy the previously described light transmittance at a wavelength of 380 nm. In general, the thicknesses may be preferably 1 μm or more, more preferably 5 μm or more, and particularly preferably 10 μm or more. From another aspect, the thicknesses may be preferably 100 μm or less, more preferably 50 μm or less, and particularly preferably 30 μm or less.

The materials of the transparent resin films 21a, 21b, and 21c can be appropriately selected from known transparent resin films, and may be the same material or may also be different materials. Examples of the transparent resin films include films made of polyester-based resins such as polyethylene terephthalate and polyethylene naphthalate; polyolefin-based resins such as polyethylene, polypropylene, poly(4-methyl-1-pentene), and poly-1-butene; polycarbonate-based resins; polyvinyl chloride-based resins; polyether sulfone-based resins; polyethylene sulfide-based resins; styrene-based resins; acrylic-based resins; polyamide-based resins; and cellulose-based resins such as cellulose acetate, or a laminated film thereof, among which polyester films may be preferred and polyethylene terephthalate films may be particularly preferred.

Any one or two or more of the transparent resin films 21a, 21b, and 21c may contain an ultraviolet absorber. In this case, layers including the transparent resin film or films 21a and/or 21b and the above pressure sensitive adhesive layer 22a containing an ultraviolet absorber serve as the ultraviolet absorbing layers in the present embodiment, and layers including the transparent resin film 21c and the above pressure sensitive adhesive layer 22b containing an ultraviolet absorber also serve as the ultraviolet absorbing layers in the present embodiment.

The hard coat layer 211 can be formed of a known material, and its thickness is not particularly limited and can be a general thickness.

The window film 2 in the present embodiment can be manufactured by a conventionally known method, and the method is not particularly limited.

When the window film 2 in the present embodiment is attached to a window glass, the viewing angle can be controlled such that, for example, the other side of the window film 2 can be seen when viewed from a predetermined angle while the other side of the window film 2 cannot be seen when viewed from another angle.

2. Display Body Using External Light

Figure 4:
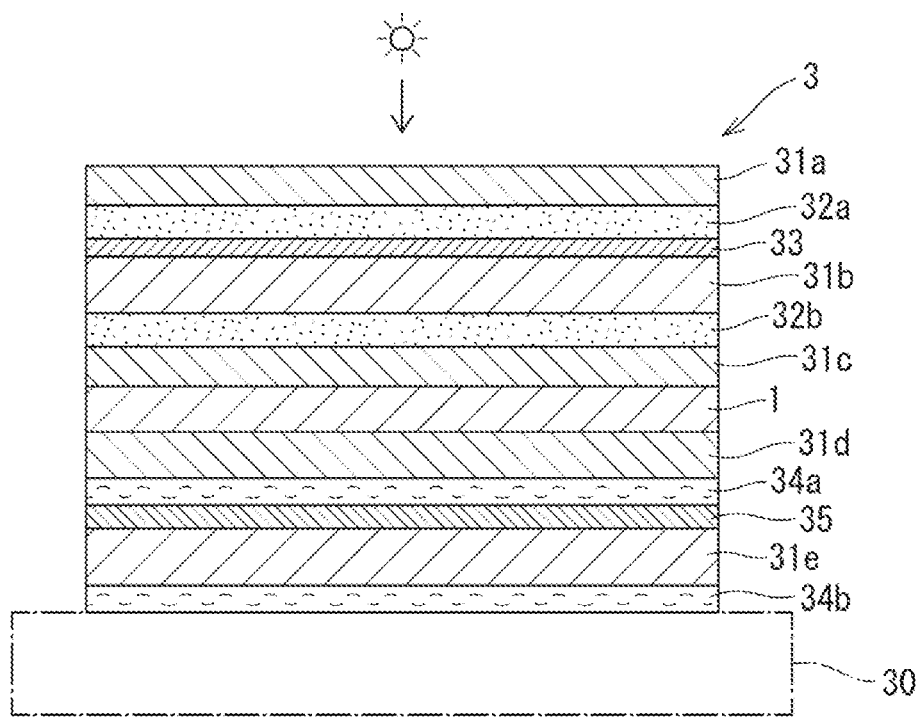
FIG. 4 is a cross-sectional view of the laminate (display body using external light) according to another embodiment of the present invention.

FIG. 4 illustrates a display body using external light (e.g., a station name board, or a running in board) as an example of the laminate according to the present embodiment. As illustrated in FIG. 4, the display body using external light 3 in the present embodiment is configured to include a transparent resin film 31a, a pressure sensitive adhesive layer 32a containing an ultraviolet absorber, a decorative layer 33, a transparent resin film 31b, a pressure sensitive adhesive layer 32b containing an ultraviolet absorber, a transparent resin film 31c, a light diffusion control film 1, a transparent resin film 31d, a pressure sensitive adhesive layer 34a, a reflective layer 35, a transparent resin film 31e, and a pressure sensitive adhesive layer 34b in this order from the top of the figure. The transparent resin film 31c and/or the transparent resin film 31d may be omitted.

The display body using external light 3 in the present embodiment may be attached to a base material (frame member) 30 or the like via the pressure sensitive adhesive layer 34b. In the present embodiment, sunlight is incident on the display body using external light 3 from above in the figure, that is, from the transparent resin film 31a side.

The light diffusion control film 1 is the light diffusion control film 1 according to the previously described embodiment. In the display body using external light 3 in the present embodiment, the internal structure of the light diffusion control film 1 may be preferably the column structure 11A or its modified structure (such as a two-layer structure of a bent column structure having columnar bodies bent at the middle and a column structure having linear columnar bodies), but is not limited thereto.

In the display body using external light 3 in the present embodiment, layers including at least the pressure sensitive adhesive layer 32a containing an ultraviolet absorber and the pressure sensitive adhesive layer 32b containing an ultraviolet absorber each correspond to the ultraviolet absorbing layer.

The thicknesses of the pressure sensitive adhesive layers 32a and 32b containing an ultraviolet absorber are not particularly limited, provided that the layers exhibit the desired adhesive strength and satisfy the previously described light transmittance at a wavelength of 380 nm. In general, the thicknesses may each be preferably 1 μm or more, more preferably 5 μm or more, particularly preferably 10 μm or more, and further preferably 15 μm or more. From another aspect, the thicknesses may each be preferably 100 μm or less, more preferably 50 μm or less, and particularly preferably 30 μm or less.

The materials of the transparent resin films 31a, 31b, 31c, 31d, and 31e can be appropriately selected from known transparent resin films, and may be the same material or may also be different materials. Examples of the transparent resin films include films made of polyester-based resins such as polyethylene terephthalate and polyethylene naphthalate; polyolefin-based resins such as polyethylene, polypropylene, poly(4-methyl-1-pentene), and poly-1-butene; polycarbonate-based resins; polyvinyl chloride-based resins; polyether sulfone-based resins; polyethylene sulfide-based resins; styrene-based resins; acrylic-based resins; polyamide-based resins; cellulose-based resins such as cellulose acetate; and fluorine-based resins, or a laminated film thereof.

The transparent resin film 31a may be preferably a fluorine-based resin film among the above because of the excellent light resistance. The surface of the transparent resin film 31a on the external light side may be glossy or may also be matte. The transparent resin films 31b and 31e may be preferably polyvinyl chloride films or polyethylene terephthalate films. The transparent resin films 31c and 31d may be preferably polyester films and particularly preferably polyethylene terephthalate films.

Any one or two or more of the transparent resin films 31a, 31b, and 31c may contain an ultraviolet absorber. In particular, the transparent resin films 31a and 31b may preferably contain an ultraviolet absorber. In this case, layers including the transparent resin film or films and the above pressure sensitive adhesive layers 32a and 32b containing an ultraviolet absorber serve as the ultraviolet absorbing layers in the present embodiment.

The thicknesses of the transparent resin films 31a and 31b containing an ultraviolet absorber may be preferably 10 μm or more, particularly preferably 50 μm or more, and further preferably 80 μm or more from the viewpoint of achieving both the ultraviolet absorbability and the visible light transmissivity. From the same viewpoint, the thicknesses may be preferably 1,000 μm or less, more preferably 500 μm or less, and further preferably 200 μm or less.

Here, the light transmittance of an ultraviolet absorber-containing fluorine-based resin film at a wavelength of 380 nm may be preferably 40% or less, more preferably 20% or less, particularly preferably 10% or less, further preferably 5% or less, and most preferably 3% or less. On the other hand, the lower limit of the light transmittance is not particularly limited and may be preferably 0%. From the viewpoint of balancing with high transmittance in the visible light region, the lower limit of the light transmittance may be preferably 0.01% or more, more preferably 0.1% or more, particularly preferably 1.0% or more, and further preferably 1.5% or more. When the light transmittance of the ultraviolet absorber-containing fluorine-based resin film at a wavelength of 380 nm falls within the above range, yellowing of the light diffusion control film can be suppressed, and a given member can be protected from ultraviolet rays.

The ultraviolet absorber-containing fluorine-based resin film may preferably have high transmissivity for light rays in the visible light region. From this viewpoint, the light transmittance of the ultraviolet absorber-containing fluorine-based resin film at a wavelength of 480 nm may be preferably 60% or more, more preferably 80% or more, particularly preferably 86% or more, and further preferably 90% or more. From the same viewpoint, the light transmittance of the ultraviolet absorber-containing fluorine-based resin film at a wavelength of 580 nm may be preferably 60% or more, more preferably 80% or more, particularly preferably 86% or more, and further preferably 90% or more. On the other hand, the upper limit of the light transmittance at a wavelength of 480 nm and the upper limit of the light transmittance at a wavelength of 580 nm of the ultraviolet absorber-containing fluorine-based resin film are not particularly limited and may be preferably 100%. From the viewpoint of balancing with low transmittance in the ultraviolet light region, the above upper limits may be preferably 99% or less and particularly preferably 98% or less.

From the viewpoint of giving light resistance, the light transmittance of an ultraviolet absorber-containing polyvinyl chloride (PVC)-based resin film at a wavelength of 380 nm may be preferably 95% or less, more preferably 90% or less, particularly preferably 80% or less, further preferably 70% or less, and most preferably 65% or less. On the other hand, from the viewpoint of balancing with high transmittance in the visible light region, the lower limit of the light transmittance may be preferably 1% or more, more preferably 10% or more, particularly preferably 20% or more, further preferably 35% or more, and most preferably 50% or more.

The PVC-based resin film may preferably have high transmissivity for light rays in the visible light region. From this viewpoint, the light transmittance of the PVC-based resin film at a wavelength of 480 nm may be preferably 60% or more, more preferably 80% or more, particularly preferably 86% or more, and further preferably 90% or more. From the same viewpoint, the light transmittance of the PVC-based resin film at a wavelength of 580 nm may be preferably 60% or more, more preferably 80% or more, particularly preferably 86% or more, and further preferably 90% or more. On the other hand, the upper limit of the light transmittance at a wavelength of 480 nm and the upper limit of the light transmittance at a wavelength of 580 nm of the PVC-based resin film are not particularly limited and may be preferably 100%. From the viewpoint of balancing with low transmittance in the ultraviolet light region, the above upper limits may be preferably 99% or less and particularly preferably 98% or less.

The decorative layer 33 is not particularly limited, provided that it can present the display content by characters, patterns, or the like and does not interfere with the desired light diffusion effect, and conventionally known ones can be used. For example, the decorative layer may be printed with ink constituting characters, patterns, or the like on the surface of the transparent resin film 31b.

The thickness of the decorative layer 33 is not particularly limited, but may be preferably 10 μm or more and particularly preferably 20 μm or more, for example. From another aspect, the thickness may be preferably 1,000 μm or less and particularly preferably 500 μm or less.

The type of the pressure sensitive adhesive constituting the pressure sensitive adhesive layers 34a and 34b is not particularly limited, and conventionally known ones can be used. Examples of the pressure sensitive adhesive for use include an acrylic-based pressure sensitive adhesive, a silicone-based pressure sensitive adhesive, a urethane-based pressure sensitive adhesive, and a rubber-based pressure sensitive adhesive, among which the acrylic-based pressure sensitive adhesive may be preferred because it can readily achieve satisfactory pressure sensitive adhesive property and transparency.

The thicknesses of the pressure sensitive adhesive layers 34a and 34b are not particularly limited, provided that sufficient pressure sensitive adhesive property can be achieved, and may be preferably 1 μm or more and particularly preferably 3 μm or more. From another aspect, the thicknesses may be preferably 100 μm or less and particularly preferably 30 μm or less.

The reflective layer 35 may be a reflective layer having a smooth surface (specular reflective layer) or a reflective layer having retroreflective ability. In the case of a specular reflection layer, it can be formed as a metal vapor deposition layer, for example, by performing vapor deposition or the like of a metal on the surface of the transparent resin film 31e. Examples of the metal vapor deposition layer include an aluminum vapor deposition layer, a silver vapor deposition layer, a stainless steel vapor deposition layer, and a copper vapor deposition layer. The thickness of the reflective layer 35 in this case can be a general thickness as that for a metal vapor deposition layer.

In the case of a reflective layer having retroreflective ability, examples thereof for use include those in which a considerable number of corner cubes are arranged on the reflective surface (corner cube type, prism lens type), those having a structure in which a considerable number of glass beads are arranged on the reflective surface and covered with a transparent resin film via a certain space above the glass beads (capsule lens type), those having a structure in which a considerable number of glass beads are encapsulated in a transparent resin sheet (encapsulated lens type), and those in which a considerable number of glass beads are arranged so as to be exposed on the reflective surface (exposed lens type). The thickness of the reflective layer 35 in this case is not particularly limited, and may be 0.01 mm or more and particularly 0.1 mm or more, for example. From another aspect, the thickness may be 1 mm or less and particularly 0.5 mm or less, for example.

The display body using external light 3 in the present embodiment can be manufactured by a conventionally known method, and the method is not particularly limited.

When the display body using external light 3 in the present embodiment is used, for example, as a built-in type station name board (station name board installed on the platform at a height equivalent to the line of sight of a person), even in a station where no illuminators are provided around the station, passengers of a train can visually recognize the built-in type station name board using the light from the train, especially the light leaking from the doors, at night.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

EXAMPLES

Hereinafter, the present invention will be described further specifically with reference to examples etc., but the scope of the present invention is not limited to these examples etc.

Production Example 1

(Production of Light Diffusion Control Film Having Louver Structure)
1. Preparation of Light Diffusion Control Composition Polypropylene glycol, isophorone diisocyanate, and 2-hydroxyethyl methacrylate were reacted to obtain polyether urethane methacrylate having a weight-average molecular weight of 9,900. After compounding 60 mass parts (solid content equivalent value; here and hereinafter) of o-phenylphenoxyethoxyethyl acrylate as the high refractive index component, 40 mass parts of the above polyether urethane methacrylate as the low refractive index component, 8 mass parts of 2-hydroxy-2-methyl-1-phenylpropan-1-one as the photopolymerization initiator, 3 mass parts (2.7 mass %) of dipentaerythritol hexaacrylate as the polyfunctional monomer, and 0.08 mass parts (0.07 mass %) of a benzophenone-based compound (available from BASF, product name "Tinuvin 384-2") as the ultraviolet absorber, the compounded materials were heated and mixed under a condition of 80° C. to obtain a light diffusion control composition.

Here, the previously described weight-average molecular weight (Mw) refers to a weight-average molecular weight that is measured as a standard polystyrene equivalent value under the following condition using gel permeation chromatography (GPC) (GPC measurement).
<Measurement Condition>
  Measurement apparatus: HLC-8320 available from Tosoh Corporation
  GPC columns (passing through in the following order): available from Tosoh Corporation
    TSK gel super H-H
    TSK gel super HM-H
    TSK gel super H2000
  Solvent for measurement: tetrahydrofuran
  Measurement temperature: 40° C.
2. Formation of Light Diffusion Control Film One surface of a long polyethylene terephthalate film (thickness of 50 μm; first PET film) as the process sheet was coated with the obtained light diffusion control composition to form a coating film. A laminate composed of the coating film and the process sheet was thus obtained.

Subsequently, the obtained laminate was placed on a conveyor. At that time, the surface of the laminate on the coating film side was on the upper side, and the longitudinal direction of the process sheet was made parallel to the flow direction of the conveyor. Then, an ultraviolet irradiation apparatus (available from EYE GRAPHICS CO., LTD., product name "ECS-4011GX") having a linear high-pressure mercury lamp with a cold mirror for light concentration was installed on the conveyor on which the laminate was placed. This apparatus can irradiate an object with ultraviolet rays concentrated in a strip shape (approximately linear shape). Upon installation of the above ultraviolet irradiation apparatus, it was installed so that the longitudinal direction of the above high-pressure mercury lamp and the flow direction of the conveyor were orthogonal to each other.

When viewed from the longitudinal direction of the high-pressure mercury lamp, the irradiation angle of the ultraviolet rays emitted from the high-pressure mercury lamp to the laminate was set to 10° with reference to the normal line to the surface of the laminate. The irradiation angle referred to herein is described as a positive value of the acute angle formed between the normal line to the surface of the laminate and the ultraviolet rays when the ultraviolet rays are emitted toward the downstream side of the flow of the conveyor with reference to the position of the laminate just below the high-pressure mercury lamp while described as a negative value of the acute angle formed between the normal line to the surface of the laminate and the ultraviolet rays when the ultraviolet rays are emitted toward the upstream side of the flow of the conveyor.

Thereafter, while the conveyor was operated to move the above laminate at a speed of 1.0 m/min, the coating film in the laminate was cured by being irradiated with ultraviolet rays under the conditions of a peak illuminance of 2.5 mW/cm$^2$ and an integrated light amount of 40.0 mJ/cm$^2$ on the coating film surface (this curing may be referred to as "primary curing" for convenience).

Subsequently, after a polyethylene terephthalate film (second PET film) having a thickness of 38 μm was laminated on the surface of the laminate on the coating film side, the coating film in the laminate was cured by being irradiated through the film with ultra violet rays (scattered light) under the conditions of a peak illuminance of 190 mW/cm² and an integrated light amount of 180 mJ/cm² (this curing may be referred to as "secondary curing" for convenience). The above-described peak illuminance and integrated light amount were measured using a UV METER (available from EYE GRAPHICS CO., LTD., product name "EYE Ultraviolet Integrated Illuminance Meter UVPF-A1") equipped with a light receiver and installed for the position of the coating film.

Through the above primary curing and secondary curing, a light diffusion control film having a thickness of 200 μm was obtained such that the above-described coating film was cured. Thus, a laminate was obtained in which the second PET film having a thickness of 38 μm, the light diffusion control film, and the first PET film (process sheet) having a thickness of 50 μm were laminated in this order. The thickness of the light diffusion control film was measured using a constant-pressure thickness meter (available from TECLOCK Co., Ltd., product name "Teclock PG-02J").

When the cross section of the formed light diffusion control film was observed with a microscope, it was confirmed that a louver structure was formed in which a plurality of plate-like regions was alternately arranged in one direction along the film surface.

Production Examples 2 to 11

Laminates including the light diffusion control films were manufactured in the same manner as in Production Example 1 except that the compounding amount of the polyfunctional monomer, the compounding amount of a hindered amine-based compound (available from BASF, product name "Tinuvin 292"), the compounding amount of the ultraviolet absorber, and the compounding amount of an antioxidant (n-octadecyl-3-(4'-hydroxy-3',5'-di-t-butylphenyl) propionate) were as listed in Table 1.

Example 1

An acrylic-based pressure sensitive adhesive layer (without an ultraviolet absorber, thickness of 25 μm) was laminated on the first PET film side of the laminate (second PET film/light diffusion control film/first PET film) including the light diffusion control film manufactured in Production Example 1.

Then, an acrylic-based pressure sensitive adhesive layer (thickness of 20 μm) containing an ultraviolet absorber was laminated on one surface of a first polyvinyl chloride resin (PVC) film (containing an ultraviolet absorber, thickness of 80 μm).

In addition, an aluminum layer (nano-order thickness) was vapor-deposited as the reflective layer on one surface of a second PVC film (without an ultraviolet absorber, thickness of 50 μm). Then, an acrylic-based pressure sensitive adhesive layer (without an ultraviolet absorber, thickness of 25 μm) was laminated on the surface of the PVC film opposite to the reflective layer.

Furthermore, an acrylic-based pressure sensitive adhesive layer (thickness of 20 μm) containing an ultraviolet absorber was laminated on one surface of a fluorine-based resin film (containing an ultraviolet absorber, thickness of 100 μm).

The above components were laminated to obtain a laminate as a display body using pseudo-external light composed of the fluorine-based resin film, the acrylic-based pressure sensitive adhesive layer containing an ultraviolet absorber, the first PVC film, the acrylic-based pressure sensitive adhesive layer containing an ultraviolet absorber, the second PET film, the light diffusion control film, the first PET film, the acrylic-based pressure sensitive adhesive layer, the reflective layer, the second PVC film, and the acrylic-based pressure sensitive adhesive layer in this order from the top (see FIG. 4, but without a decorative layer).

Example 2

A laminate as the display body using pseudo-external light was manufactured in the same manner as in Example 1 except that the light diffusion control film obtained in Production Example 2 was used.

Example 3

A laminate as the display body using pseudo-external light was manufactured in the same manner as in Example 1 except that the light diffusion control film obtained in Production Example 3 was used.

Example 4

A laminate as the display body using pseudo-external light was manufactured in the same manner as in Example 1 except that the light diffusion control film obtained in Production Example 4 was used.

Example 5

A laminate as the display body using pseudo-external light was manufactured in the same manner as in Example 1 except that the light diffusion control film obtained in Production Example 5 was used.

Example 6

A laminate as the display body using pseudo-external light was manufactured in the same manner as in Example 1 except that the light diffusion control film obtained in Production Example 6 was used.

Example 7

A laminate as the display body using pseudo-external light was manufactured in the same manner as in Example 1 except that the light diffusion control film obtained in Production Example 7 was used.

Example 8

A laminate as the display body using pseudo-external light was manufactured in the same manner as in Example 1 except that the light diffusion control film obtained in Production Example 8 was used.

Example 9

A laminate as the display body using pseudo-external light was manufactured in the same manner as in Example 1 except that the light diffusion control film obtained in Production Example 9 was used.

Comparative Example 1

A laminate as the display body using pseudo-external light was manufactured in the same manner as in Example 1 except that the light diffusion control film obtained in Production Example 10 was used.

Comparative Example 2

A laminate as the display body using pseudo-external light was manufactured in the same manner as in Example 1 except that the light diffusion control film obtained in Production Example 11 was used.

Comparative Example 3

The laminate (second PET film/light diffusion control film/first PET film) including the light diffusion control film obtained in Production Example 11 was used as Comparative Example 3.

Testing Example 1

(Measurement of Light Transmittance)
The pressure sensitive adhesive layer containing an ultraviolet (UV) absorber used in each of Examples and Comparative Examples was attached to a glass plate, and this was used as a sample. The light transmittance (%) of the sample was measured using an ultraviolet-visible-near infrared (UV-Vis-NIR) spectrophotometer (available from Shimadzu Corporation, product name "UV-3600"). The light transmittances at wavelengths of 380 nm, 480 nm, and 580 nm based on the results are listed in Table 2.

For the first PVC film used in each of Examples and Comparative Examples, the light transmittance (%) was measured in the same manner as above. The light transmittances at wavelengths of 380 nm, 480 nm, and 580 nm based on the results are listed in Table 2.

For the fluorine-based resin film used in each of Examples and Comparative Examples, the light transmittance (%) was measured in the same manner as above. The light transmittances at wavelengths of 380 nm, 480 nm, and 580 nm based on the results are listed in Table 2.

A laminate (laminate of four layers from the top; ultraviolet absorbing layers) of the fluorine-based resin film, the pressure sensitive adhesive layer containing an ultraviolet absorber, the first PVC film, and the pressure sensitive adhesive layer containing an ultraviolet absorber prepared in each of Examples 1 to 9 and Comparative Examples 1 and 2 was attached to a glass plate via the latter pressure sensitive adhesive layer, and this was used as a sample. The light transmittance (%) of the sample was measured in the same manner as above. The light transmittances at wavelengths of 380 nm, 480 nm, and 580 nm based on the results are listed in Table 2.

Testing Example 2

(Measurement of Indentation Elastic Modulus)
For the single body of the light diffusion control film used in each of Examples and Comparative Examples (the first PET film and the second PET film had been removed), the indentation elastic modulus was measured under the following conditions using a dynamic ultra-micro hardness tester (available from Shimadzu Corporation, product name "Shimadzu Dynamic Ultra Micro Hardness Tester DUH-W201S"). The results are listed in Table 3.
Indenter: Triangular 115
Measurement mode: Load-unload test
Maximum load: 2 mN
Holding time when the maximum load was reached: 10 seconds
Load speed: 0.1422 mN/sec Testing Example 3

(Measurement of Variable Haze Angle Range)
For the light diffusion control film used in each of Examples and Comparative Examples, the haze value (%) was measured using a variable haze meter (available from Toyo Seiki Seisaku-sho, Ltd., product name "Haze-Gard-Plus, Variable Haze Meter"). Specifically, the surface on the second PET film side of the laminate (second PET film/light diffusion control film/first PET film) including the light diffusion control film was irradiated with light rays while varying the incident angle with respect to the normal line of the surface within a range of −70° to 70° (range of ±70° from the normal line) along the longitudinal direction of the light diffusion control film, and the haze value (%) was measured at each incident angle. Details of the measurement conditions are as follows.
Light source: C light source
Measurement diameter: φ18 mm
Opening diameter of integrating sphere: φ25.4 mm
Subsequently, for the results measured as above, the incident angle range in which the haze value was 60% or more was specified in the incident angle measurement range (−70° to 70°), and the difference between two angles at the end points of the range was calculated and determined as the angle range (variable haze angle range) giving a haze value of 60% or more. The results are listed in Table 3.

Testing Example 4

(Measurement of Yxy and L*a*b*)
For the laminate as the display body using pseudo-external light obtained in each of Examples and Comparative Examples, the luminance Y, chromaticity x, and chromaticity y defined by the CIE1931 XYZ (Yxy) color system and the lightness L*, chromaticity a*, and chromaticity b* defined by the CIE1976 L*a*b* color system were measured using an ultraviolet-visible-near infrared (UV-Vis-NIR) spectrophotometer (available from Shimadzu Corporation, product name "UV-3600"). The results are listed in Table 3.

Also for the laminate as the display body using pseudo-external light obtained in each of Examples and Comparative Examples, the laminate was irradiated with ultraviolet rays for 1,000 hours (irradiance: 500±100 W/m$^2$) under an atmosphere of a temperature of 63±3° C. (black panel temperature) and 50% RH in accordance with JIS A1439: 2016 using an ultraviolet fade meter (Fade) (available from Suga Test Instruments Co., Ltd., product name "U48"). For the laminate after the irradiation, the luminance Y, chromaticity x, and chromaticity y and the lightness L*, chromaticity a*, and chromaticity b* were measured in the same manner as above. In addition, Δb*, which is the difference in the chromaticity b* before and after the ultraviolet irradiation, was calculated. The results are listed in Table 4.

Further for the laminate as the display body using pseudo-external light obtained in each of Examples and Comparative Examples, the laminate was irradiated with ultraviolet rays for 1,000 hours (irradiance: 78.5 W/m$^2$) under an atmosphere of a temperature of 63±3° C. (black panel temperature) and 50% RH in accordance with JIS A1439: 2016 using a sunshine weather-ometer (SWOM) (available from Suga Test Instruments Co., Ltd., product name "S80"). For the laminate after the irradiation, the luminance Y, chromaticity x, and chromaticity y and the lightness L*, chromaticity a*, and chromaticity b* were measured in the same manner as above. In addition, Δb*, which is the difference in the chromaticity b* before and after the ultraviolet irradiation, was calculated. The results are listed in Table 5.

Testing Example 5

(Measurement of YI)

For the laminate as the display body using pseudo-external light obtained in each of Examples and Comparative Examples, the yellowness index YI was measured in accordance with JIS K7373: 2006 using a spectrocolorimeter (available from Nippon Denshoku Industries Co., Ltd., product name "SE6000"). The results are listed in Table 3.

Also for the laminate as the display body using pseudo-external light obtained in each of Examples and Comparative Examples, the laminate was irradiated with ultraviolet rays for 1,000 hours using the ultraviolet fade meter (Fade) in the same manner as in Testing Example 4. For the laminate after the irradiation, the yellowness index YI was measured in the same manner as above. In addition, the change of yellowness index ΔYI, which is the difference in the yellowness index YI before and after the ultraviolet irradiation, was calculated. The results are listed in Table 4.

Further for the laminate as the display body using pseudo-external light obtained in each of Examples and Comparative Examples, the laminate was irradiated with ultraviolet rays for 1,000 hours using the sunshine weather-ometer (SWOM) in the same manner as in Testing Example 4. For the laminate after the irradiation, the yellowness index YI was measured in the same manner as above. In addition, the change of yellowness index ΔYI, which is the difference in the yellowness index YI before and after the ultraviolet irradiation, was calculated. The results are listed in Table 5.

Testing Example 6

(Evaluation of Liquefaction Suppression)

For the laminate as the display body using pseudo-external light obtained in each of Examples and Comparative Examples, the laminate was irradiated with ultraviolet rays for 1,000 hours using the ultraviolet fade meter (Fade) in the same manner as in Testing Example 4. Subsequently, the laminate was disassembled and the liquefaction of the light diffusion control film was examined. Then, suppression of the liquefaction was evaluated based on the following evaluation criteria. The results are listed in Table 4.

Further for the laminate as the display body using pseudo-external light obtained in each of Examples and Comparative Examples, the laminate was irradiated with ultraviolet rays for 1,000 hours using the sunshine weather-ometer (SWOM) in the same manner as in Testing Example 4. Subsequently, the laminate was disassembled and the liquefaction of the light diffusion control film was examined. Then, suppression of the liquefaction was evaluated based on the following evaluation criteria. The results are listed in Table 5.

<Evaluation Criteria for Liquefaction Suppression>
A . . . No liquefaction was confirmed.
B . . . Tack occurred, but no remarkable liquefaction was confirmed.
C . . . Liquefaction was confirmed.

TABLE 1

| | High refractive index component | Low refractive index component | Photopolymerization initiator | Polyfunctional monomer | | Hindered amine-based compound | | Ultraviolet absorber | | Antioxidant | |
|---|---|---|---|---|---|---|---|---|---|---|---|
| | mass parts | mass parts | mass parts | mass parts | mass % | mass parts | mass % | mass parts | mass % | mass parts | mass % |
| Production Example 1 | 60 | 40 | 8 | 3 | 2.7 | — | — | 0.08 | 0.07 | — | — |
| Production Example 2 | 60 | 40 | 8 | 5 | 4.4 | — | — | 0.08 | 0.07 | — | — |
| Production Example 3 | 60 | 40 | 8 | 7 | 6.1 | — | — | 0.08 | 0.07 | — | — |
| Production Example 4 | 60 | 40 | 8 | 3 | 2.7 | 0.2 | 0.18 | 0.08 | 0.07 | — | — |
| Production Example 5 | 60 | 40 | 8 | 5 | 4.4 | 0.2 | 0.18 | 0.08 | 0.07 | 0.05 | 0.04 |
| Production Example 6 | 60 | 40 | 8 | 5 | 4.4 | 0.5 | 0.44 | 0.08 | 0.07 | — | — |
| Production Example 7 | 60 | 40 | 8 | 5 | 4.4 | 0.5 | 0.44 | 0.08 | 0.07 | 0.05 | 0.04 |
| Production Example 8 | 60 | 40 | 8 | 5 | 4.4 | 1.0 | 0.88 | 0.08 | 0.07 | — | — |
| Production Example 9 | 60 | 40 | 8 | 7 | 6.0 | 1.0 | 0.86 | 0.08 | 0.07 | 0.05 | 0.04 |
| Production Example 10 | 60 | 40 | 8 | — | — | — | — | — | — | — | — |
| Production Example 11 | 60 | 40 | 8 | — | — | — | — | 0.08 | 0.07 | — | — |

TABLE 2

| | Light transmittance (%) | | | |
|---|---|---|---|---|
| Wavelength (nm) | Pressure sensitive adhesive layer containing UV absorber | PVC film | Fluorine-based resin firm | Ultraviolet absorbing layers |
| 380 | 0.02 | 64.17 | 1.924 | 0.019 |
| 480 | 92.238 | 91.56 | 93.327 | 91.473 |
| 580 | 92.323 | 91.462 | 92.905 | 91.163 |

TABLE 3

| | Initial | | | | | | | | |
|---|---|---|---|---|---|---|---|---|---|
| | Indentation elastic modulus (MPa) | Variable haze angle range (deg.) | Y | x | y | L* | a* | b* | YI |
| Example 1 | 55 | 39.1 (Threshold: 60%) | 69.09 | 0.31 | 0.33 | 86.55 | −3.07 | 4.46 | 7.20 |
| Example 2 | 101 | 36.0 (Threshold: 60%) | 69.76 | 0.31 | 0.33 | 86.88 | −3.15 | 4.55 | 6.59 |
| Example 3 | 165 | 39.8 (Threshold: 60%) | 69.92 | 0.31 | 0.33 | 86.96 | −3.23 | 4.61 | 7.06 |
| Example 4 | 62 | 37.8 (Threshold: 60%) | 70.49 | 0.31 | 0.33 | 87.23 | −2.71 | 4.13 | 5.02 |
| Example 5 | 96 | 36.7 (Threshold: 60%) | 71.51 | 0.31 | 0.33 | 87.73 | −2.79 | 4.07 | 4.46 |
| Example 6 | 96 | 36.1 (Threshold: 60%) | 70.78 | 0.31 | 0.33 | 87.38 | −2.76 | 4.23 | 5.92 |
| Example 7 | 98 | 35.0 (Threshold: 60%) | 70.59 | 0.31 | 0.33 | 87.29 | −2.77 | 4.24 | 5.95 |
| Example 8 | 101 | 33.0 (Threshold: 60%) | 70.80 | 0.31 | 0.33 | 87.39 | −2.81 | 4.37 | 5.88 |
| Example 9 | 166 | 32.3 (Threshold: 60%) | 72.10 | 0.31 | 0.33 | 88.02 | −2.82 | 4.48 | 5.41 |
| Comparative Example 1 | 27 | 31.2 (Threshold: 60%) | 69.01 | 0.31 | 0.33 | 86.51 | −3.17 | 4.48 | 7.60 |
| Comparative Example 2 | 25 | 39.9 (Threshold: 60%) | 69.23 | 0.31 | 0.33 | 86.62 | −3.19 | 4.49 | 7.73 |
| Comparative Example 3 | 25 | 39.9 (Threshold: 60%) | 70.39 | 0.31 | 0.33 | 86.75 | −3.20 | 4.80 | 8.00 |

TABLE 4

| | After Fade for 1000 hours | | | | | | | | | |
|---|---|---|---|---|---|---|---|---|---|---|
| | Y | x | y | L* | a* | b* | ⊿b* | YI | ⊿YI | Evaluation of liquefaction suppression |
| Example 1 | 66.20 | 0.34 | 0.36 | 85.10 | −6.77 | 18.05 | 13.59 | 31.30 | 24.10 | B |
| Example 2 | 65.42 | 0.34 | 0.36 | 84.70 | −6.65 | 19.64 | 15.09 | 33.90 | 27.31 | A |
| Example 3 | 65.29 | 0.34 | 0.36 | 84.63 | −6.75 | 20.26 | 15.65 | 34.64 | 27.58 | A |
| Example 4 | 66.40 | 0.33 | 0.35 | 85.22 | −4.79 | 16.52 | 12.39 | 30.05 | 25.03 | A |
| Example 5 | 67.82 | 0.33 | 0.35 | 85.98 | −4.86 | 16.82 | 12.75 | 24.80 | 20.34 | A |
| Example 6 | 66.99 | 0.34 | 0.36 | 85.55 | −4.81 | 15.95 | 11.72 | 22.41 | 16.49 | A |
| Example 7 | 66.75 | 0.33 | 0.35 | 85.43 | −4.80 | 17.11 | 12.87 | 31.26 | 25.31 | A |
| Example 8 | 67.80 | 0.34 | 0.36 | 85.90 | −4.75 | 16.13 | 11.76 | 17.80 | 11.92 | A |
| Example 9 | 68.32 | 0.34 | 0.35 | 86.25 | −4.80 | 17.03 | 12.55 | 30.60 | 25.19 | A |
| Comparative Example 1 | 66.00 | 0.34 | 0.36 | 85.00 | −7.03 | 19.23 | 15.88 | 28.95 | 21.35 | C |
| Comparative Example 2 | 64.49 | 0.34 | 0.36 | 84.22 | −6.25 | 19.27 | 14.78 | 35.62 | 27.89 | C |
| Comparative Example 3 | 41.81 | 0.41 | 0.39 | 75.03 | 7.07 | 49.85 | 45.10 | 131.87 | 123.87 | A |

TABLE 5

| | After SWOM for 1000 hours | | | | | | | | | |
|---|---|---|---|---|---|---|---|---|---|---|
| | Y | x | y | L* | a* | b* | ⊿b* | YI | ⊿YI | Evaluation of liquefaction suppression |
| Example 1 | 67.52 | 0.33 | 0.35 | 85.77 | −5.77 | 12.51 | 8.05 | 21.46 | 14.26 | B |
| Example 2 | 67.41 | 0.33 | 0.34 | 85.71 | −5.49 | 11.93 | 7.38 | 19.52 | 12.93 | A |
| Example 3 | 68.10 | 0.33 | 0.35 | 86.06 | −5.67 | 12.31 | 7.71 | 20.81 | 13.75 | A |
| Example 4 | 67.70 | 0.32 | 0.34 | 85.86 | −4.10 | 11.42 | 7.29 | 20.64 | 15.62 | A |
| Example 5 | 69.36 | 0.32 | 0.34 | 86.68 | −4.14 | 11.67 | 7.60 | 17.02 | 12.56 | A |
| Example 6 | 68.39 | 0.32 | 0.34 | 86.20 | −4.10 | 11.09 | 6.86 | 15.36 | 9.44 | A |
| Example 7 | 68.16 | 0.32 | 0.34 | 86.09 | −4.08 | 11.91 | 7.67 | 21.40 | 15.45 | A |
| Example 8 | 69.10 | 0.32 | 0.34 | 86.55 | −4.06 | 11.14 | 6.76 | 12.08 | 6.20 | A |
| Example 9 | 69.91 | 0.32 | 0.34 | 86.95 | −4.10 | 11.83 | 7.34 | 20.95 | 15.54 | A |
| Comparative Example 1 | 67.92 | 0.32 | 0.34 | 85.97 | −5.29 | 11.04 | 6.56 | 20.71 | 13.11 | C |
| Comparative Example 2 | 67.83 | 0.33 | 0.35 | 85.92 | −5.97 | 13.04 | 8.55 | 23.84 | 16.11 | C |
| Comparative Example 3 | 62.38 | 0.37 | 0.37 | 82.57 | −2.50 | 43.13 | 38.33 | 99.89 | 91.89 | A |

As can be found from Tables 4 and 5, in the laminate as the display body using pseudo-external light obtained in each of Examples, the liquefaction and yellowing of the light diffusion control film due to long-term ultraviolet irradiation were sufficiently suppressed.

INDUSTRIAL APPLICABILITY

The light diffusion control film and laminate according to the present invention can be suitably used, for example, for a window film intended to control the viewing angle, a display body using external light with improved visibility from a predetermined angle, and the like.

DESCRIPTION OF REFERENCE NUMERALS

1 . . . Light diffusion control film
11A . . . Column structure
111 . . . Columnar body having relatively high refractive index
112 . . . Region having relatively low refractive index
11B . . . Louver structure
113 . . . Plate-like region having relatively high refractive index
114 . . . Region having relatively low refractive index
2 . . . Window film
211 . . . Hard coat layer
21a, 21b, 21c . . . Transparent resin film
22a, 22b . . . Pressure sensitive adhesive layer containing ultraviolet absorber
20 . . . Window glass
3 . . . Display body using external light
31a, 31b, 31c, 31d, 31e . . . Transparent resin film
32a, 32b . . . Pressure sensitive adhesive layer containing ultraviolet absorber
33 . . . Decorative layer
34a, 34b . . . Pressure sensitive adhesive layer
35 . . . Reflective layer
30 . . . Base material (frame member)

The invention claimed is:

1. A laminate used under an environment irradiated with external light, the laminate comprising:
a light diffusion control film having an internal structure in the film, the internal structure comprising a plurality of regions having a relatively high refractive index in a region having a relatively low refractive index; and
an ultraviolet absorbing layer located further on an external light incident side than the light diffusion control film,
wherein:
the light diffusion control film contains a polyfunctional monomer; and
the light diffusion control film has an indentation elastic modulus of 30 MPa or more and 1,000 MPa or less as measured at a maximum load of 2 mN by a nanoindentation method.

2. The laminate according to claim 1, wherein the light diffusion control film contains a hindered amine-based compound.

3. The laminate according to claim 1, wherein the light diffusion control film contains an ultraviolet absorber.

4. The laminate according to claim 1, wherein the ultraviolet absorbing layer has a light transmittance of 30% or less at a wavelength of 380 nm.

5. The laminate according to claim 1, wherein the laminate is a window film.

6. The laminate according to claim 5, comprising ultraviolet absorbing layers on both sides of the light diffusion control film.

7. The laminate according to claim 1, wherein the laminate is a display body using external light.

8. A light diffusion control film used in a laminate used under an environment irradiated with external light, the laminate comprising the light diffusion control film and an ultraviolet absorbing layer located further on an external light incident side than the light diffusion control film,
the light diffusion control film having an internal structure in the film, the internal structure comprising a plurality of regions having a relatively high refractive index in a region having a relatively low refractive index,
wherein:
the light diffusion control film contains a polyfunctional monomer; and
the light diffusion control film has an indentation elastic modulus of 30 MPa or more and 1,000 MPa or less as measured at a maximum load of 2 mN by a nanoindentation method.

* * * * *